United States Patent [19]

Patterson

[11] 3,734,342

[45] May 22, 1973

[54] BOX ENCLOSURE FOR ELECTRICAL CIRCUITS

[75] Inventor: William L. Patterson, Berlin, Mass.

[73] Assignee: Adams-Russell Co., Inc., Waltham, Mass.

[22] Filed: July 9, 1971

[21] Appl. No.: 161,053

[52] U.S. Cl. .................. 220/3.94, 220/4 A, 220/55 B
[51] Int. Cl. ................................................ H02g 3/10
[58] Field of Search .................... 220/3.92, 3.94, 4 A, 220/55 B

[56] References Cited

UNITED STATES PATENTS

| | | | |
|---|---|---|---|
| 1,648,704 | 11/1927 | Volk, Jr. | 220/3.94 X |
| 1,101,892 | 6/1914 | Vibber | 220/3.94 X |
| 2,316,404 | 4/1943 | Carter, Jr. | 220/3.92 X |
| 3,514,525 | 5/1970 | Flachbarth et al. | 220/3.94 X |
| 2,057,116 | 10/1936 | Rubens | 220/3.94 X |
| 3,288,910 | 11/1966 | Zerwes | 220/3.94 X |

*Primary Examiner*—M. Henson Wood, Jr.
*Assistant Examiner*—Michael Mar
*Attorney*—Herbert W. Kenway, Melvin R. Jenney, Richard R. Hildreth et al.

[57] ABSTRACT

A box enclosure for electrical circuits formed of a unitray rectangular side wall and top and bottom cover plates. A pair of tubular internally threaded rivets are fastened through the bottom cover plate at diagonally opposite corners, the upper plate having holes through it at the corresponding corners and being fastened in place by screws engaging the internally threaded rivets.

2 Claims, 3 Drawing Figures

Patented May 22, 1973  3,734,342

INVENTOR
WILLIAM L. PATTERSON
BY
Kenway, Jenney & Hildreth
ATTORNEYS

BOX ENCLOSURE FOR ELECTRICAL CIRCUITS

BACKGROUND OF THE INVENTION

This invention relates in general to metallic enclosure boxes and more particularly to an economical construction of a metallic box for enclosing electrical circuits.

There are a number of applications in which electronic circuitry or microstrip circuitry, in the form of printed boards or of separate components mounted on boards, is to be enclosed in a metallic box as a separate subassembly. In many such arrangements the box includes coaxial connectors for providing cable connections to the circuitry enclosed within and also includes mounting sockets to position the enclosed subassembly in spaced relation with other elements in a system.

In the usual manufactured form, metallic enclosures are formed of an integral side wall defining the rectangular volume of the enclosure, with top and bottom covers fastened to the side wall after the circuitry has been assembled within the enclosure. Most usually the side wall is cast from metal and includes holes at reinforced corners, which holes are tapped to receive screws fastening each cover in place. The mounting sockets, generally in the form of tapped recesses are usually located on one of the plates to form the basis for mounting the entire box.

It will be apparent that in addition to ruggedness and ease of assembly, economy is a major factor in the design of this enclosure. One factor which contributes to the cost of boxes of this general prior art type are the requirements for the cumulative hole tolerances being within preset limits. Thus, there are four holes in both the upper and lower edges of the integrated side members and these must be within reasonable tolerances to permit the cover plates to be assembled. The position of the coaxial connector with respect to the housing is also set by four holes. Thus the tolerances between the mounting sockets, which are carried in one of the cover plates and the position of the coaxial connector, depends not only on the hole tolerances of the mounting for the coaxial connector, but also on the hole tolerances for the mounting of that plate. A significant cost factor in fabrication of these enclosures arises from the drilling and tapping of these holes.

SUMMARY OF THE INVENTION

Broadly speaking, the electrical box enclosure of this invention comprises a unified member defining a rectangular enclosure and a pair of cover plates. One of the cover plates has mounted to it, at diagonally opposite corners, a pair of upstanding tubular rivets with internal threads. A washer is placed over each of the tubular rivets and fitted snugly to the plate in which the rivets are mounted. The spacing of the rivets in one cover plate and the size of the washers are arranged such that when the unitary side wall is placed over this cover plate, the washers fit into the diagonal opposite corners of the wall positioning the plate with respect to the wall. The other plate is then fastened to the upstanding rivet sections with screws placed through the holes in that plate. The tubular openings in the bottom of the rivets now provide mounting holes for threading other units or mounting posts into the bottom of the box. It should be noted that there are only two rivets in one cover plate and two holes in the other, thereby decreasing hole tolerances and substantially decreasing the costs of fabrication and assembly. There are no cover mounting holes in the cast side wall piece and it is not necessary to tap any threads in any one of the elements. If a coaxial connector is fastened to the side wall only the hole tolerances of the coaxial connector mounting itself and the tolerances of the washer rivet assembly accumulate between the coaxial connector and the mounting hole.

DESCRIPTION OF PREFERRED EMBODIMENTS

Figure 1:
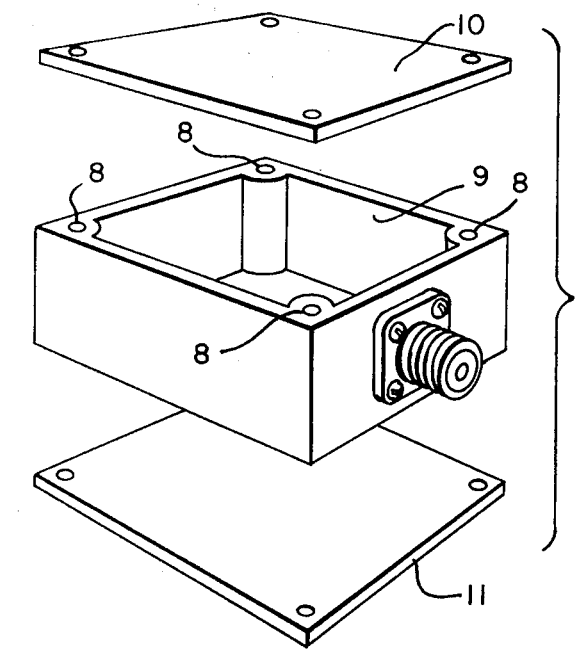
FIG. 1 is an illustration in an exploded perspective view of a prior art electrical box enclosure.

A typical enclosure of the prior art is shown in FIG. 1. The enclosure includes a side wall element 9 and a pair of cover plates 10 and 11 to be fastened to tapped holes 8 in the corners of side wall 9 with screws.

Figure 2:
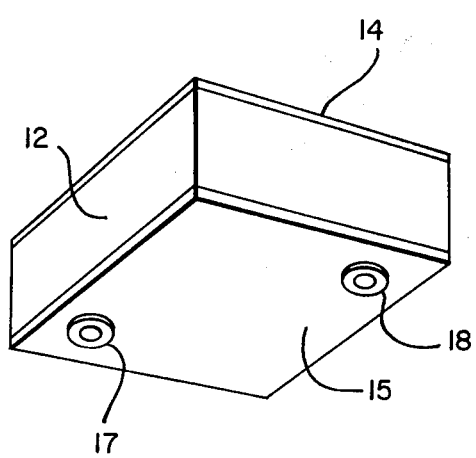
FIG. 2 is an illustration in perspective view of and enclosure box constructed in accordance with the principles of this invention.
Figure 3:
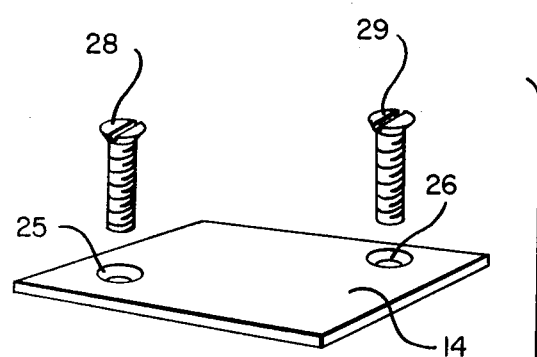
FIG. 3 is an illustration in exploded view of the enclosure box of FIG. 2.
Figure 3:
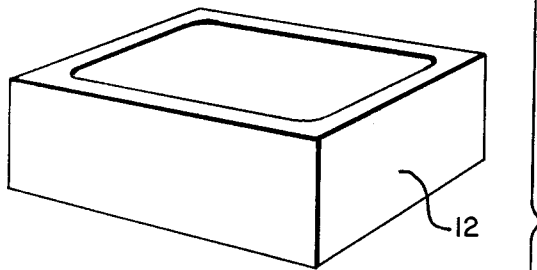
Figure 3:
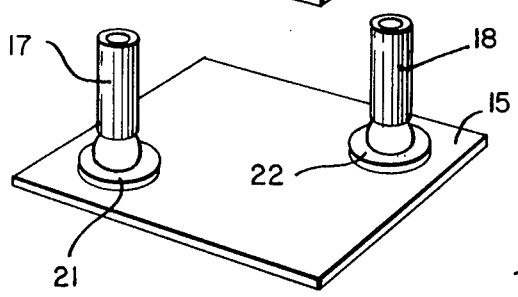

With reference now to FIGS. 2 and 3 the electrical box enclosure is seen to include a generally unitary rectangular side wall casting 12, an upper cover plate 14 and the lower cover plate 15. Mounted in the lower cover plate 15 at diagonally opposite corners are tubular rivets 17 and 18, each having internal threads. Such rivets are available, for example, under the Trademark RIVNUTS from B. F. Goodrich Company, Akron, Ohio, These tubular rivets are mounted in plate 15 in the conventional fashion for such rivets by expansion of the shank. A pair of washers 21 and 22 are placed around the rivets prior to expanding and they are therefore clamped with the rivet to cover plate 15. The height of the rivets 17 and 18 is made slightly less than the height of the rectangular side wall 12. The rivets 17 and 18 are diagonally spaced such that, with the washers 21 and 22 they fit snugly in the internal corners of the side wall 12, thereby positioning the lower plate in approximate superposition with the outer periphery of the side wall 12.

The upper cover plate 14 has a pair of holes 25 and 26, through which a pair of screws 28 and 29 are passed. The holes 25 and 26 are positioned to correspond to the rivet position 17 and 18 in the lower plate and the entire enclosure is assembled by placing the rectangular side wall element 12 over the cover plate 15 and then fastening the upper cover plate 14 to the internally threaded tubular rivets 17 and 18 by means of screws 28 and 29. Since the bottom of the tubular rivets 17 and 18 are open and since they contain the internal threads, then the lower portions of these rivets 17 and 18 fastened to plate 15 serve as mounting sockets for the electrical box.

It will be apparent that with this assembly only two holes in either plate 14 and 15 need be formed and that the casting 12 may be assembled without the necessity of drilling and tapping holes to retain the cover plates.

While two diagonal rivets have been illustrated it will be apparent that the assembly could be formed with four tubular rivets positioned to define the rectangle, either at the corners or as one on each wall of the side wall member.

What is claimed is:

1. An electrical box enclosure of generally rectangular form comprising,
   a side wall member forming the four side walls of a rectangular box, said side wall being of substantially uniform height;
   a first generally rectangular cover plate for covering the top opening of said side wall member;
   a second generally rectangular cover plate for covering the bottom opening of said side wall member,
   a pair of internally threaded tubular rivets fastened to and extending through said second cover plate at diagonally opposite corners thereof, said rivets extending from said plate a distance less than said substantially uniform height of said side wall member, said first plate having openings therethrough at diagonal opposite corners corresponding to the position of said tubular rivets on said second plate, said second plate being positioned such that said tubular rivets are included within the opening of said side wall member and said first plate being fastened on top of said side wall member by screws extending through said openings in the plate and engaging the corresponding internally threaded tubular rivets positioning means extending from said rivets toward the adjacent corner of said cover plate to contact the internal walls of said wall member to position said first and second cover plates with respect thereto.

2. An enclosure in accordance with claim 1 wherein said positioning means includes a pair of flat washers placed over each of said tubular rivets in close juxtaposition to said second plate, the dimensions of said washers and the spacing of said rivets being such that said washers are in contact with the internal walls of said wall member to position said first and second cover plates with respect thereto.

* * * * *